INVENTOR.
BY Henry A. Giesecke

United States Patent Office
3,447,859
Patented June 3, 1969

3,447,859
COMPACT COMBINATION OF A SEPARATELY USABLE PLANE MIRROR AND ROOF MIRROR
Henry A. Giesecke, Valley Stream, N.Y., assignor to Apromat, Inc., Barrington, Ill., a corporation of Delaware
Filed May 3, 1965, Ser. No. 452,628
Int. Cl. G02b 17/00, 5/08; G02f
U.S. Cl. 350—203                      6 Claims

ABSTRACT OF THE DISCLOSURE

A unitary mirror structure, one portion of which has a mirror surface for direct-vision projection through a lens system as well as an additional mirror surface which cooperates with a mirror surface on another portion to form a roof mirror for laterally reversed projection. The structure is rotatable between positions for direct-vision and reversed projections, the axis of rotation being disposed in parallel to and at equal distances from the roof edge as well as the center line of the first-mentioned mirror surface.

---

Mirror or prism attachments located around, behind or in front of optical lens systems, e.g., in photocopying apparatus or cameras, are intended to image an object in proper, normal lateral relationship or laterally reversed, either completely (by 180°) or at a right angle. For this purpose, use is made of roof mirrors or triply combined flat mirrors, roof, dove, penta and similar prisms.

In view of the high quality of lens systems for reproduction work, such mirrors require an extremely high degree of precision in order to be efficient in use, but the prior art systems are not satisfactory. They cut down the angle of view, reduce the brightness of the incident light and, due to an inaccurate roof angle, cause visible "dot" displacements (drop in sharpness of contrast). From a purely practical standpoint, the mechanical expenditure is too great, the weight too heavy and the price too high. These latter disadvantages, to be sure, are of minor importance for large reproduction cameras, but prevent their use in principle for simpler photocopying apparatus.

The practical difficulties reside predominantly in maintaining the position of mirrors at the required accuracy of ±0.5 second to each other—with the material subject to mechanical and thermal stresses—for a long period of time without readjustment.

In the case of roof prisms having a fixed roof angle, this difficulty, it is true, is circumvented but, in addition to the high weight and cost of such prisms, the long path through the glass is disturbing from a standpoint of luminous efficiency.

Since the lenses which are best suitable for such attachment systems, must have an extreme color correction for the imaging ratio of 1:0.5 to 1:5, lens systems of strictly symmetrical construction are used. Disturbance of the symmetry (with respect to the central aperture) by a unilateral prism insertion causes considerable chromatic lateral error which mathematically effects probably a balancing effect by equalizing supplementary lenses, but cannot eliminate the chromasia of higher order.

As examples of such displacements of symmetry, mention may be made of U.S. Patents 2,845,841 and 3,054,326. In U.S. Patent 2,282,656, the dove prism, for this reason, is placed symmetrically to the lens system in the plane of the central aperture but the dove prism itself is not symmetrical and greatly constricts the luminous flux. To place two identical prism glass paths symmetrically in front of and behind the lens systems would double the light absorption, the weight and the technical expenditure.

In order to arrive at a smaller prism system, in systems available in commerce, field angle illuminations below 40° and lens systems of a stop of less than F:22 are used.

The development of the construction of camera and photocopying apparatus is, however, towards extremely wide-angled lens systems (in order to arrive at smaller camera dimensions) of a field angle of more than 60° and high-speed apertures which proportionally increase the resolution and the contrast.

It is an object of the present invention to eliminate the foregoing drawbacks.

Other objects and advantages of the invention will be apparent from the following description and the drawings which illustrate the invention by way of example as follows:

FIG. 1A is a cross-section along line z—z of FIG. 1.

Figure 1:
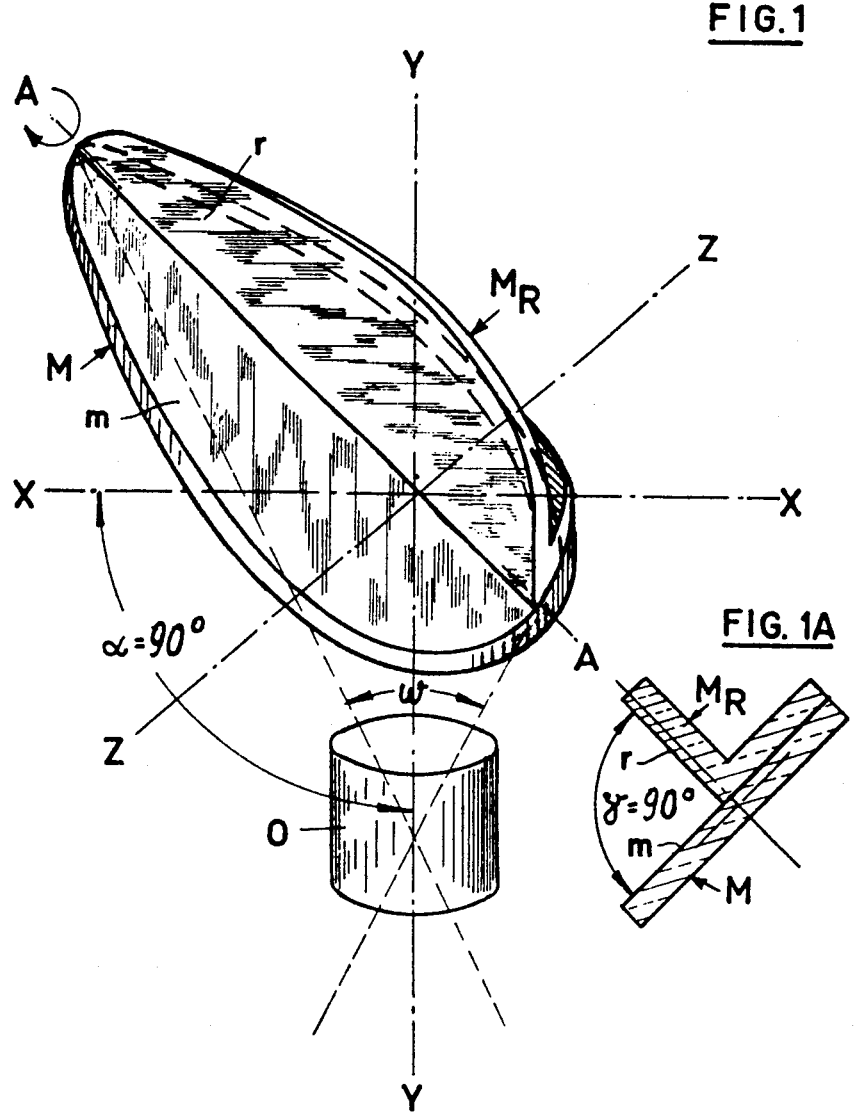
FIG. 1 is a diagrammatic perspective view of an embodiment of the invention.

In the space coordinates x—x, y—y, z—z of FIG. 1, the mirror M lies at an angle of 45°, the mirror having an elliptical shape due to the field-angle conic section. The major axis of this ellipse is parallel to a swivel axis A—A to the mirror, and the minor axis lies in the z—z direction. The optical axis of the lens system O lies in the coordinate direction y—y and the light is reflected at right angles at the mirror M.

The mirror M is plane parallel and on its rear, there is placed another, semi-elliptical mirror $M_R$. Surface $r$ of the latter mirror forms a roof prism with the mirrored half rear surface $m$ of the flat mirror M for double reflection of images.

As already mentioned, the precision of the angle of each roof prism arrangement must be exceptionally great and for this reason, the mirror surface attached at a right angle to the half mirror $M_R$ must be widened so that a good, exact bond in contact process is assured to the rear of the plane mirror M having flat parallel faces. By rotation through an angle $\delta$ around the axis A—A, the flat mirror M is on the one hand, swung to effect a complete turning of the image while on the other hand, the roof mirror system formed by the surfaces $m$ and $r$ is swung to turn the picture for lateral reversing in front of the imaging lens system.

All mirrors are covered with a metallic mirroring surface or made of a speculum metal. The mirror M is a plate of the thickness $d$ with plane parallel faces.

Figure 2:
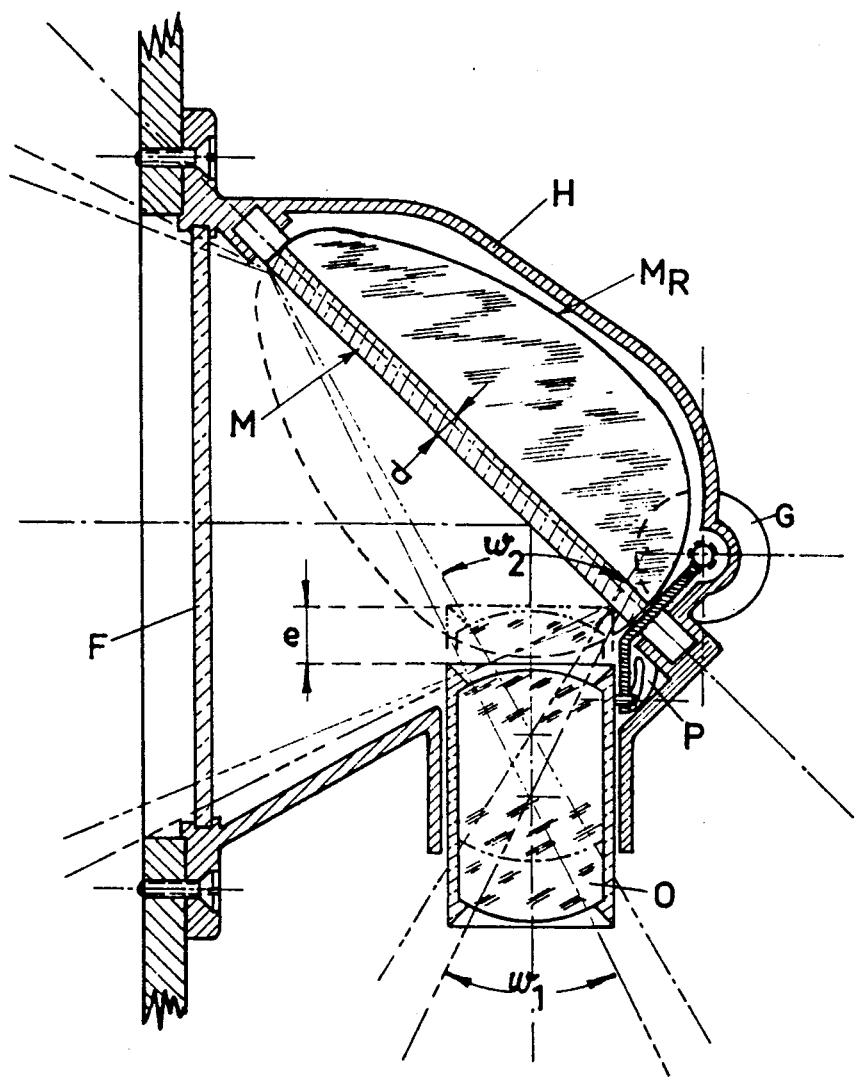
FIG. 2 is an elevational section illustrating a housing and other details used in connection with the embodiment shown in principle in FIGS. 1 and 1A.

FIG. 2 shows how this mirror attachment is arranged in a housing H in front of the objective lens O. This housing is sealed off on the object side by the lens O and on the image side by a transparent plate having plane parallel faces or by a similar color filter F. By means of a gearing G, the swivel pins A—A effect the advancing of the corresponding mirror system.

Figure 3:
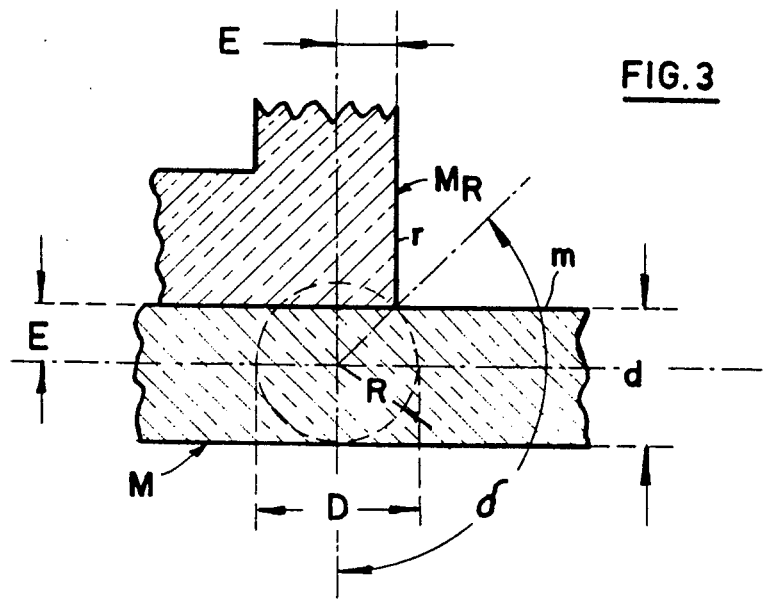
FIG. 3 is a fragmentary cross-section similar to FIG. 1A, but viewed from the opposite direction and shown on an enlarged scale.

It is of essential importance that upon each adjustment of the picture (direct-vision or in reverse lateral relationship), no displacement out of the limiting frame of the picture size is effected. In FIG. 3, this picture-shift compensation is effected, in accordance with the invention, in the manner that the axis of rotation within the mirror M is placed in a given ratio to the thickness $d$ of the plate and to the angle of rotation δ. The center line of the mirror surface M extends in FIG. 3 perpendicular to the plane of the drawing and passes through the point of contact between the surface M and the circle shown in FIG. 3. If this common circle through the apex or roof edge and the center line of the flat mirror has the diameter D and the distance of the axis of rotation from the planes $m$ and $r$ is E (see FIG. 3), then $$D = \frac{2E}{\sin(\delta - 90°)}$$

and $$E = \frac{D \times \sin(\delta - 90°)}{2}$$

If the radius R of rotation of the roof edge equal to $D/2$ is introduced, then $$E = R \times \sin(\delta - 90°)$$

As a result of this arrangement, the roof edge of the roof mirror system and the center line of the flat mirror are rotatable into the same position relative to the lens system. The closer the lens system O can be brought to a mirror system lying obliquely in front of it, the smaller for a given lens field angle will be the dimension of the mirror axes. Furthermore, due to the swinging of the mirror, the mirror edge can pass by the objective lens. It is necessary that during the swinging, the objective lens be shifted axially to the mirror system or vice versa.

Figure 4:
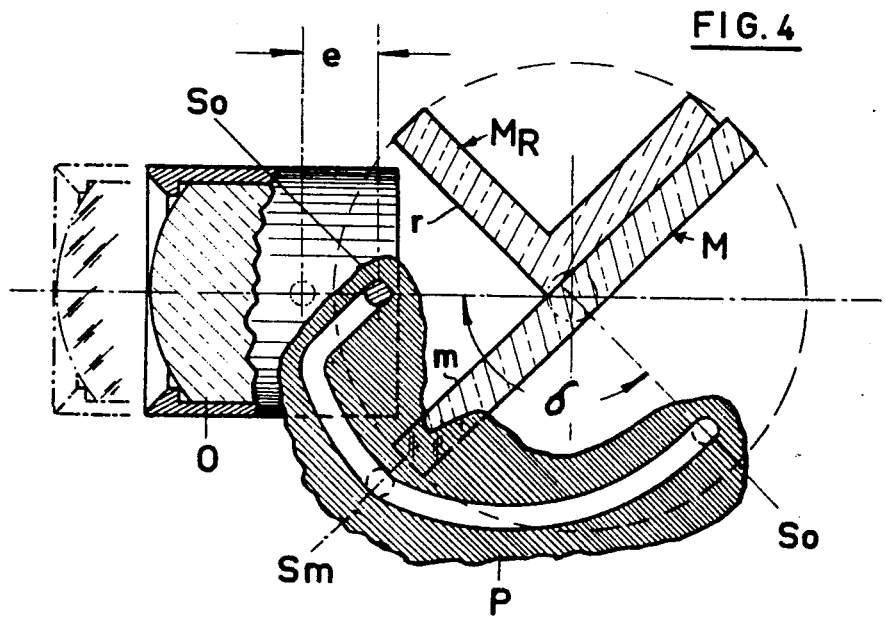
FIG. 4 is an enlarged cross-section similar to FIG. 1A and illustrates further details.

In FIG. 4, these conditions are shown in a cross section. All structural parts concerned bear the same designations as in the preceding figures. The displacement $e$ is caused by the gear segment P fastened to the rotating structure, the groove of which gear segment P provides a path of displacement from the point $S_m$ furthest from the axis to points $S_o$ closest to the axis. The point furthest from the axis should lie precisely in the direction of the minor elliptical axis. In FIGS. 2 and 4, operative and withdrawn positions of the lens system are indicated in dot-dash and full lines.

Figure 5:
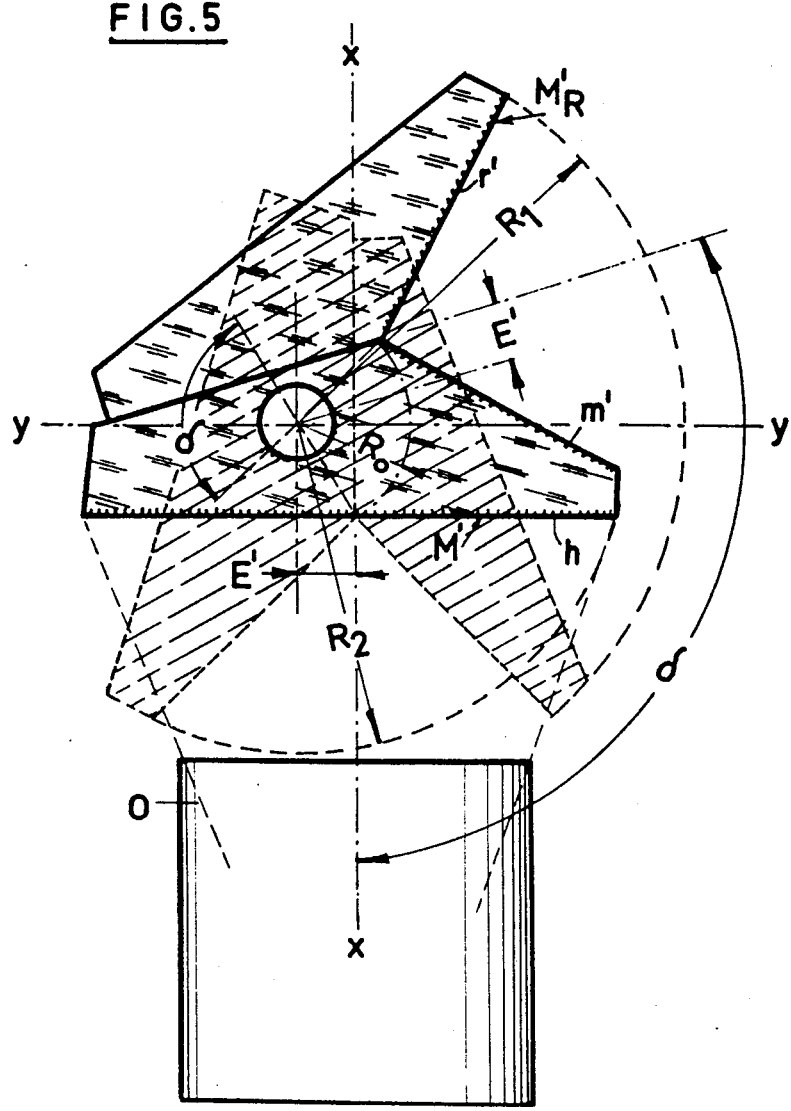
FIG. 5 is a diagrammatic end view of a modified embodiment.

FIG. 5 shows a similar mirror unit, the position for laterally reversed projection being indicated in broken lines. In this case, however, the roof-forming mirror surfaces $m'$ and $r'$ are developed as parts of two pieces of material M' and M'R of prismatic cross-sections, the lower part M' of which, a mirrored hypotenuse surface $h$, replaces the mirror M of the first embodiment. The axis of rotation of the angle δ passes through the mirror prism M' and is staggered—by the amounts E'—E'—to the coordinate axis $x$—$x$ and the bisector of the right angle between the roof mirror surfaces $m'$ and $r'$ in such a manner that the mirror-edge radii $R_1$ and $R_2$ are different in value. $R_2$ is now, in accordance with the invention, smaller than $R_1$; in other words, with such an arrangement—and only one optimum is possible here—the outer edge of the surface $m'$, even without displacement of the objective lens, swings past, and at a very short distance from the objective lens. In the same way, in this arrangement, there is no picture jump (image or image dot separation), analogous to the first embodiment.

The inventive features described in connection with the two embodiments relate to the same object which permits only these two optimum solutions. The advance resulting from the invention can also be noted from FIG. 5, which is drawn to scale. The free opening of the objective lens O is in a ratio to the length of the roof surface of 1:2.5 and to the mirror width of the flat surfaces of 1:1.5. The angle of view is 65°.

By way of comparison, there are available on the market 4 systems of unsatisfactory performance:

| | Ratio of lens distance to— | | Field, angle of system (deg.) |
|---|---|---|---|
| | Length of roof edge | Width of flat mirror | |
| U.S.A. prism system | 1:3.5 | 1:2.3 | 40 |
| Japan, prism system | 1:4.2 | 1:2.7 | 36 |
| England, mirror system | 1:3.5 | 1:3.0 | 38 |
| Germany, mirror system | 1:3.8 | 1:2.7 | 42 |

The weights are 25 to 125 lbs. (for 19 inch focal-length lenses), while an embodiment in accordance with the present invention has a weight of 6.7 lbs. and with indication of the optical power, constitutes a substantial advance in the art.

What is claimed is:

1. In a device for reflecting images which are projected through a lens system, a unitary mirror structure including a first portion and a second portion; a plane mirror surface on said first portion for direct-vision projection, said mirror surface having a center line; an additional mirror surface on said first portion; a complementary mirror surface positioned on said second portion, said complementary mirror surface and said additional mirror surface of the first portion being arranged so as to cooperate with each other and act as a pair of roof mirror surfaces defining a path for laterally reversed projection, said roof mirror surfaces forming a roof edge in parallel to said center line; and mounting means supporting said mirror structure for movement about an axis of rotation and through a predetermined angle between a first position wherein said plane mirror surface is operative, and a second position wherein said pair of roof mirror surfaces are operative, said axis of rotation being disposed in parallel to and at equal distances from said center line and said roof edge.

2. A device as defined in claim 1, wherein said axis of rotation is spaced from the planes of each of said pair of roof mirror surfaces in the direction away from said path by a distance E in accordance with the equation $$E = R \times \sin(\delta - 90°)$$

wherein R is the radius of rotation of said roof edge and δ is said predetermined angle; whereby in said first and second positions, image and image dot separation will be avoided.

3. A device as defined in claim 1, wherein said first portion of the unitary structure comprises a flat plate having said plane mirror surface on one side thereof and said additional mirror surfaces on its other side, and wherein said second portion of the unitary structure comprises a member of angle-shaped cross-section having one of its outer surfaces bonded to a portion of said additional mirror surface of the flat plate so as to define a generally T-shaped cross-section in conjunction with said flat plate, the other outer surface of said member representing said complementary mirror surface for cooperation with the remaining portion of said additional mirror surface of the flat plate to form said pair of roof mirror surfaces therewith.

4. A device as defined in claim 1, wherein said lens system and said mirror structure have projecting positions in which said lens system is disposed closely adjacent to said mirror structure and in the path of rotation of the latter, and an auxiliary position in which the lens system is outside of said path of rotation; and wherein said device includes mechanism for adjusting said lens system and said mirror structure linearly relative to each other to obtain said projecting and auxiliary positions, and means for turning said mirror structure about said axis of rotation, said mechanism being coupled with said means in a manner such that in connection with turning movement of said mirror structure towards said lens system, said mirror structure and lens system are brought from one of said projecting positions to said auxiliary position, while in connection with turning movement of said mirror structure away from said lens system, said mirror structure and lens system are brought to one of said projecting positions again.

5. A device as defined in claim 1, wherein said mounting means is arranged to support said mirror structure in close proximity to said lens system, and each of said pair of roof mirror surfaces has an outer end, and wherein said axis of rotation is disposed at different distances from said outer ends of the pair of roof mirror surfaces in a manner such that one of said outer ends is adapted to move across said lens system while said mirror structure is turned from its first position to its second position and vice versa.

6. A device as defined in claim 1, wherein said first portion of the mirror structure comprises a member of polygonal cross-section having a plurality of flat sides, one of said sides forming said plane mirror surface, another one of said sides forming said additional mirror surface, the two last-mentioned sides being disposed at an angle to each other, and wherein said second portion of the mirror structure comprises a complementary member of polygonal cross-section having a plurality of flat sides one of which forms said complementary mirror surface, said first-mentioned member and said complementary member being rigidly connected to each other.

References Cited

UNITED STATES PATENTS

| | | | |
|---|---|---|---|
| 2,100,442 | 11/1937 | Herrmann | 350—297 |
| 2,529,757 | 11/1950 | Baer | 95—42 |
| 2,940,358 | 6/1960 | Rosenthal | 88—24 |
| 3,142,224 | 7/1964 | Andrews et al. | 88—24 |

DAVID SCHONBERG, *Primary Examiner.*

R. J. STERN, *Assistant Examiner.*

U.S. Cl. X.R.

350—297, 300